(12) United States Patent
Glavinic et al.

(10) Patent No.: US 10,848,937 B2
(45) Date of Patent: Nov. 24, 2020

(54) SYSTEM FOR TRANSFERRING DATA FROM A WIRELESS NETWORK OF A VEHICLE

(71) Applicant: WABCO Europe BVBA, Brussels (BE)

(72) Inventors: Andelko Glavinic, Sarstedt (DE); Ulf Laude, Hambühren (DE); Rainer Risse, Pattensen-Reden (DE); Axel Stender, Hameln (DE); Norbert Witte, Lauenau (DE)

(73) Assignee: WABCO Europe BVBA, Brussels (BE)

( * ) Notice: Subject to any disclaimer, the term of this patent is extended or adjusted under 35 U.S.C. 154(b) by 107 days.

(21) Appl. No.: 16/303,286

(22) PCT Filed: May 24, 2017

(86) PCT No.: PCT/EP2017/000619
§ 371 (c)(1),
(2) Date: Nov. 20, 2018

(87) PCT Pub. No.: WO2018/006989
PCT Pub. Date: Jan. 11, 2018

(65) Prior Publication Data
US 2019/0215667 A1    Jul. 11, 2019

(30) Foreign Application Priority Data

Jul. 6, 2016  (DE) ........................ 10 2016 008 212

(51) Int. Cl.
*H04W 4/40* (2018.01)
*H04W 76/15* (2018.01)
(Continued)

(52) U.S. Cl.
CPC .............. *H04W 4/40* (2018.02); *G07C 5/008* (2013.01); *H04W 76/15* (2018.02);
(Continued)

(58) Field of Classification Search
CPC . H04Q 2208/82; H04Q 2209/82; H04W 4/40; H04W 76/15; H04W 84/12; G07C 5/008
See application file for complete search history.

(56) References Cited

U.S. PATENT DOCUMENTS 9,565,708 B2 * 2/2017 Hassan ................. H04W 76/14
10,327,119 B2 * 6/2019 Park ....................... H04W 4/21
(Continued)

FOREIGN PATENT DOCUMENTS

DE  102013006087 A1  1/2014
DE  102013208130 A1  11/2014
(Continued)

OTHER PUBLICATIONS

European Patent Office, Rijswijk, Netherlands, International Search Report of International Application No. PCT/EP2017/000619, dated Jul. 25, 2017, 2 pages.

*Primary Examiner* — Omar J Ghowrwal
(74) *Attorney, Agent, or Firm* — Dickinson Wright PLLC

(57) ABSTRACT

A system for transferring data from a wireless network of a vehicle includes a first station for covering a first wireless network, which is secured by encryption and a mobile device. The mobile device is configured for connecting to the first wireless network and to a second wireless network. The first station is provided in the vehicle, wherein access data for connecting to the two wireless networks is available in the mobile device. In the vehicle, data are available, which are transmitted from the first station to the mobile device, and from there to the second station.

10 Claims, 2 Drawing Sheets

(51) Int. Cl.
*G07C 5/00* (2006.01)
*H04L 29/06* (2006.01)
*H04W 84/12* (2009.01)

(52) U.S. Cl.
CPC ...... *H04L 63/0428* (2013.01); *H04Q 2209/82* (2013.01); *H04W 84/12* (2013.01)

(56) References Cited

U.S. PATENT DOCUMENTS

| | | | |
|---|---|---|---|
| 2003/0027607 A1* | 2/2003 | Hatakeyama | H04M 1/6066 455/569.2 |
| 2005/0240343 A1 | 10/2005 | Schmidt, II et al. | |
| 2008/0082221 A1 | 4/2008 | Nagy | |
| 2014/0067152 A1 | 3/2014 | Swanson et al. | |
| 2014/0073254 A1* | 3/2014 | Ichihara | H04W 76/14 455/41.2 |
| 2017/0289254 A1* | 10/2017 | Dieckmann | H04W 12/003 |
| 2018/0192266 A1* | 7/2018 | Park | H04B 5/0037 |

FOREIGN PATENT DOCUMENTS

| | | | | |
|---|---|---|---|---|
| DE | 102014010752 A1 | 1/2016 | | |
| WO | 2012163861 A1 | 12/2012 | | |
| WO | WO-2016026553 A1 * | 2/2016 | ......... | H04W 12/003 |

* cited by examiner

US 10,848,937 B2

SYSTEM FOR TRANSFERRING DATA FROM A WIRELESS NETWORK OF A VEHICLE

TECHNICAL FIELD

The present disclosure relates to a system for transferring data from a wireless network of a vehicle. The invention also relates to a corresponding method and to a computer program for performing the method.

BACKGROUND

Modern vehicles include electronic systems, in particular for the purpose of monitoring functions and statuses and/or for the purpose of control. The vehicle data that accrue in these systems are of interest not only to a vehicle driver but also to external users, for instance for organizing vehicle fleets, for monitoring the vehicles, preparing for maintenance breaks, etc.

Vehicle drivers often have a mobile device for communication, for instance a mobile phone, smartphone, Notepad, Notebook, or the like. It is known for a mobile device of this type to communicate via a local wireless network based on the WLAN standard IEEE-802.11 with a WLAN module of a trailer, which WLAN module is provided for this purpose; see DE 10 2014 010 752 A1. The WLAN module is connected there to a brake control module of an electronic braking system. The brake control module receives data from sensors and/or from other control modules present in the vehicle.

For example, the vehicle data involve generally fixed data such as vehicle registration, type, owner, and also dynamic data such as departure point, travel time, average speed, pressure in the braking system, axial load, properties of the load, profile of the last journey, mileage, destination.

Of particular interest is the transfer of data from the vehicle on reaching the destination or at an interim stop. Data are typically meant to be relayed to a recipient accessible via the Internet. The vehicle data are meant to be relayed in an automated manner and in the simplest way possible. At the same time, a high level of security must be maintained. At least one wireless network is present at the destination or at an interim stop. In addition, there may be further wireless networks. The object is to transmit the vehicle data from the vehicle to one of the wireless networks in an automated and secure manner.

SUMMARY OF THE INVENTION

The object is achieved by a system comprising:

A first station for covering a first wireless network, which is secured by encryption, and a mobile device for connecting to the first wireless network and a second wireless network. The first station is provided in the vehicle, wherein access data for connecting to the two wireless networks are available in the mobile device. In the vehicle, data are available, which are transmitted from the first station to the mobile device, and from there to the second station.

The mobile device is carried in the vehicle, and is connected to the first station, which is present in the vehicle. The required access data for the connection to the first station are available in the mobile device, for example by previously entering the access data into the mobile device by the vehicle driver or by transmitting a dataset to the mobile device from another point, for instance as an email or SMS. In addition, the access data for the second station are held in the mobile device. The mobile device can thereby retrieve data from the vehicle via the first station, connect to the wireless network of the second station, and transmit the vehicle data thereto. The process can run in an automated manner, namely via suitable software on the mobile device.

According to another concept of the invention, the mobile device detects the second station having the wireless network, and only thereafter causes the vehicle data to be transmitted from the vehicle via the first station to the mobile device, and from there to the second station. This ensures that the vehicle data are up to date at the time of transmission to the second station.

According to another concept of the invention, the mobile device has a connection to the network of the first station. After detecting the network of the second station and before connecting to the network of the second station, the mobile device disconnects the connection to the first station, and after transmitting the vehicle data to the second station, the mobile device restores the connection to the first station. The connection to the second station is accordingly disconnected before the connection to the first station is restored.

According to another concept of the invention, the mobile device is configured to transmit the vehicle data via the second station to a computer, in particular a web server, connected to the network. The computer may be under the control of an external user who requires the vehicle data for his own purposes.

According to another concept of the invention, the wireless network of the first station and/or of the second station is a Wireless Local Access Network (WLAN). The technology for this is known and proven; see standard IEEE-802.11.

The mobile device is preferably WLAN-enabled, in particular is a mobile phone comprising a WLAN module. The two stations of the wireless networks are operated as access points, whereas the mobile device logs into each of the networks as a client. The networks are each encrypted, so that access is not possible without access data that are present on the mobile device. An active WLAN client, including a WLAN client connected to an access point, checks continuously by default for the presence of further WLAN stations and whether it is possible to connect thereto.

According to another concept of the invention, the mobile device is a smartphone having an app for controlling the system or individual steps within the system. Apps are programs installed on a smartphone that can perform a huge range of functions, in this case controlling the system. This includes also the capability or the facility of the smartphone to detect the presence of known wireless networks. As soon as a wireless network is detected, for instance on reaching a destination, the access data available on the mobile device are used to connect to this network or the station thereof, and the vehicle data received from the vehicle is transmitted.

According to another concept of the invention, the vehicle is a tractor-trailer vehicle, in particular comprising an electronic braking system. The latter may be associated with a pneumatic braking system. In principle, the system according to the invention is intended for all forms of vehicles, on land, in the air and in the water. Land-based utility vehicles are particularly well suited as they may already be equipped with a wireless network.

According to another concept of the invention, the first station is a WLAN module, which is connected to an electronic system of the vehicle, for instance to the electronic control unit of an electronic braking system. The electronic control unit may be connected to sensors and/or to further control modules via analog lines and/or data lines.

In a method according to the invention for transferring data from a first wireless network of a vehicle to a second wireless network via a mobile device, access data for the two wireless networks are available in the mobile device. The following steps are performed:

the mobile device has a connection to the first wireless network of the vehicle and checks for the presence of known further networks;

after detecting the second wireless network, the mobile device retrieves the vehicle data from the vehicle via the first wireless network, connects to the second wireless network, and transfers the vehicle data to the network.

The method runs automatically under program control via software in the mobile device, and allows secure transmission of the vehicle data from the vehicle to the second network and/or to a recipient connected to the second network.

According to another concept of the invention, the mobile device reconnects to the first network after leaving the second network. A renewed data retrieval from the vehicle is thereby possible continuously.

According to another concept of the invention, the mobile device repeats step b) (of claim 11) after a defined timespan has elapsed and as long as the connection to the second network exists or is possible. The connection to the second network is possible while the vehicle remains in one location. During this time, data can be transmitted repeatedly, so that up-to-date data from the vehicle are also always available in the second network.

Also with regard to the method according to the invention, the wireless network of the first station and/or of the second station is in particular a WLAN. Again the mobile device may be WLAN-enabled, in particular may be a mobile phone comprising a WLAN module. The mobile device is preferably a smartphone having an app for controlling the system or individual steps within the system. The vehicle is preferably a trailer vehicle, in particular comprising an electronic braking system.

According to the disclosure, a computer program, a computer program product, or an app is provided for performing the method. The program is installed on the mobile device and controls the method steps. Preferred embodiments of the invention are explained in more detail below with reference to the appended drawings. The drawings are provided herewith for purely illustrative purposes and are not intended to limit the scope of the present invention.

DETAILED DESCRIPTION OF THE DRAWINGS

Figure 1:
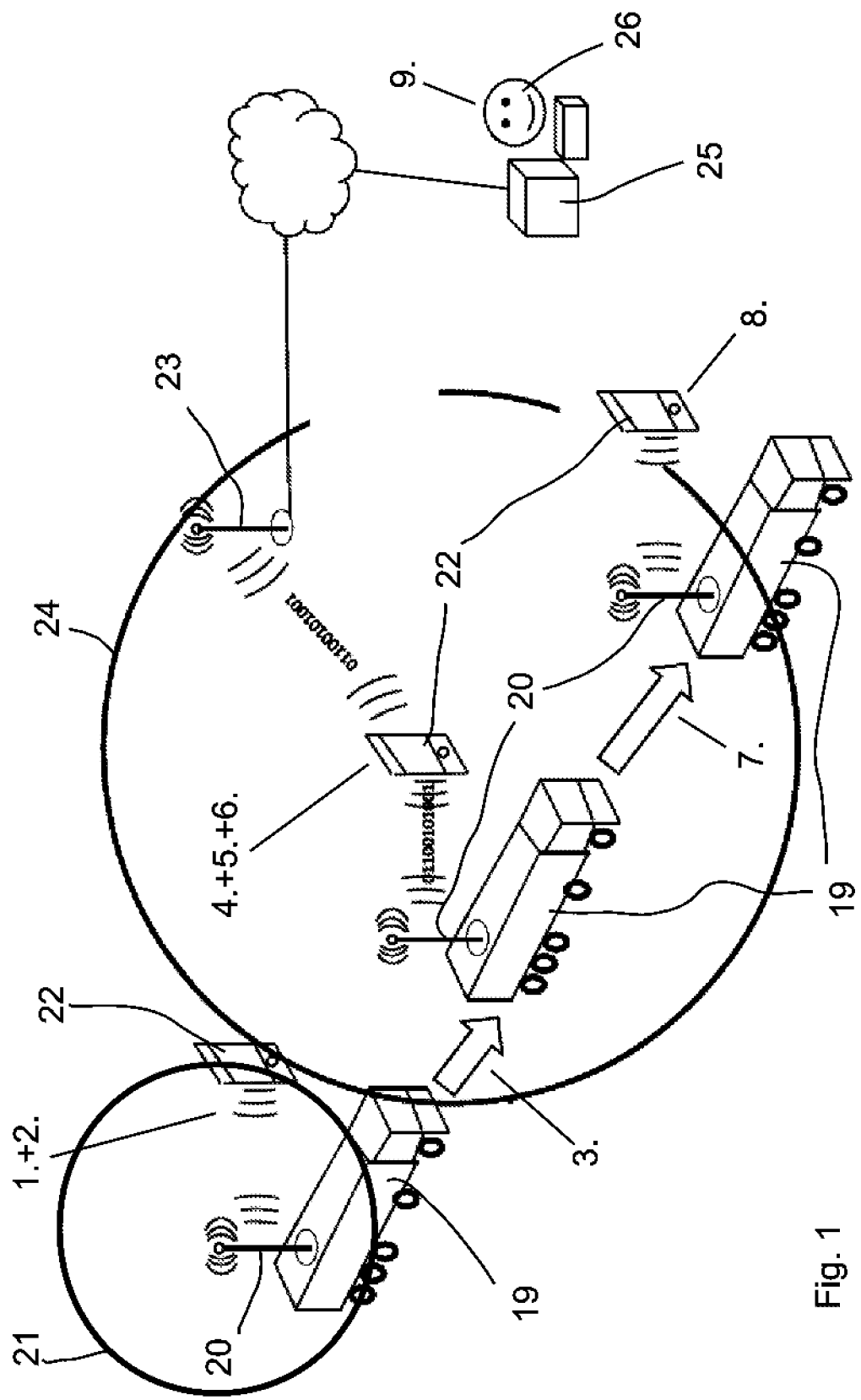
FIG. 1 is a sketch for illustrating a system according to the invention and/or a method.
Figure 2:
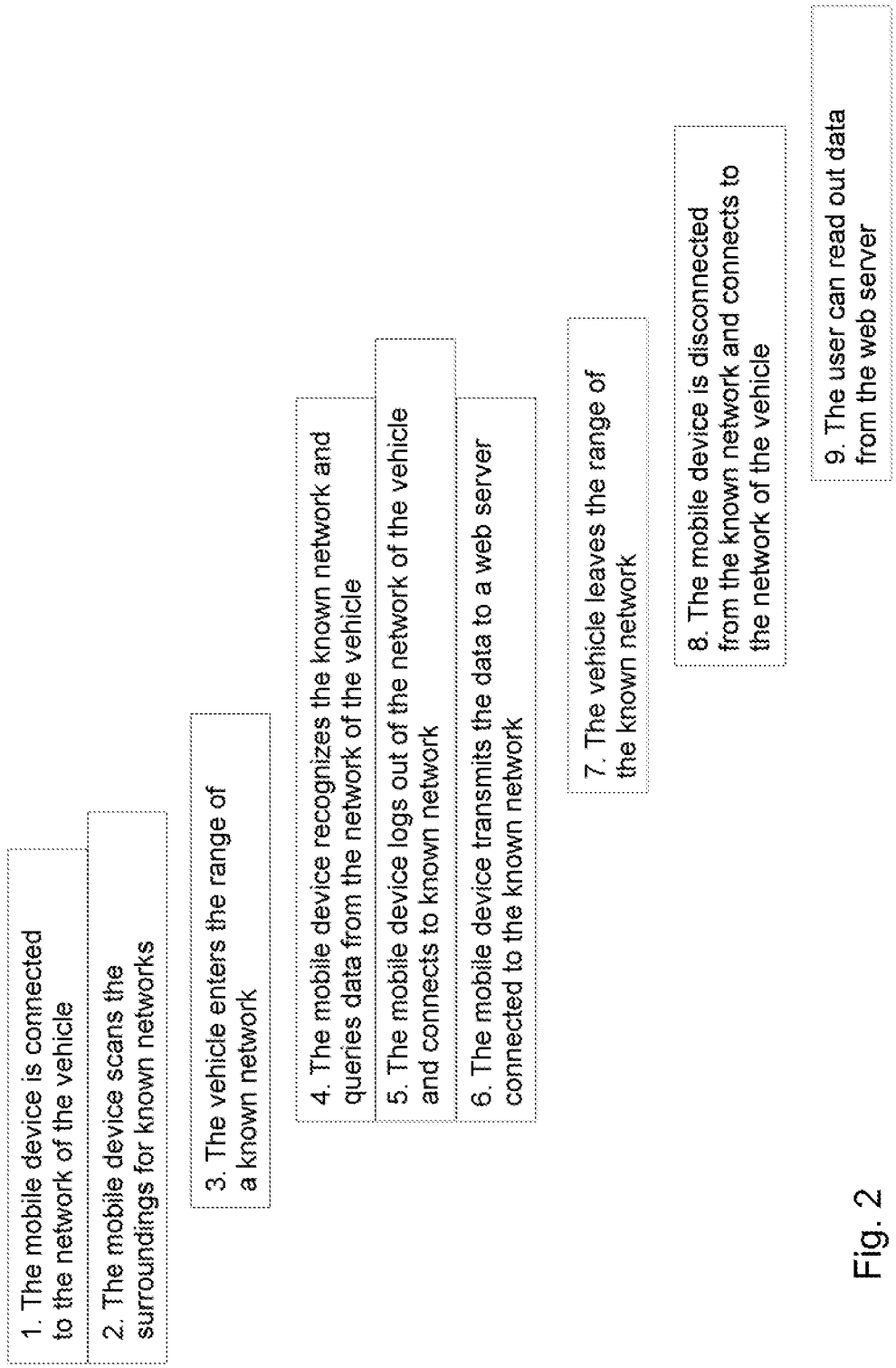
FIG. 2 shows the sequence of individual steps during implementation of the method.

In this exemplary embodiment, the method according to the invention basically consists of nine steps, which are represented in FIG. 1 by the numbers 1. to 9. In addition, FIG. 2 illustrates the sequence of the individual steps.

In the present exemplary embodiment, a system comprises the following elements:

In this case, a vehicle 19 is a truck-trailer combination composed of trailer and motor vehicle. The trailer is a semi-trailer. In the vehicle 19 is provided a WLAN module comprising a first station 20 for covering a first wireless network 21. The first station 20 is thus part of the vehicle 19, in particular of the trailer.

A mobile device 22 is a smartphone in this example, and is carried by a driver (not shown) on the vehicle 19.

A stationary second station 23 covers a second wireless network 24 (WLAN). A web server 25 is connected to the second network 24 via the Internet. An external user 26 can access the web server 25.

The mobile device 22 is WLAN-enabled and connected to the first station 20 in the vehicle 19 (see 1. in FIG. 1). Here, the first station 20 is in a mode as an access point, whereas the mobile device 22 is a client. At the same time, the mobile device 22 scans its surrounding area for known networks. For this purpose, access data of networks of interest are stored in the mobile device 22, for example the access data of a network at the next stop of the vehicle 19.

During its journey, the vehicle 19 comes into range of the second network 24 (see 3. in FIG. 1). The mobile device 22 detects the second network 24 and retrieves vehicle data from the vehicle 19 via the first station 20, and stores the vehicle data. The vehicle data are preferably data that are available in an electronic control module (not shown) connected to the first station. The mobile device 22 then establishes a connection to the second network 24, and transfers the stored vehicle data to the second network 24 and/or to the web server 25 (see 6.).

While the vehicle 19 is situated in the second network 24, the vehicle data are transmitted only once to the second station 23, or else transmitted repeatedly, for instance in a timed manner. For this purpose, the mobile device 22 can briefly establish a connection to the first station 20 in order to update the vehicle data and then transmit the vehicle data to the second station 23.

As soon as the vehicle 19 leaves the second network 24 (see 7.), the connection from the mobile device 22 to the second station 23 is broken, and the mobile device reconnects to the first station 20 of the first network 21 in the vehicle 19 (see 8.).

The external user 26 can read and/or retrieve the vehicle data stored on the web server 25. For example, the external user 26 is the employee of an organizational body for route planning, for fleet management and/or for vehicle maintenance. The user may also be a customer given the facility for shipment tracking, or financial management of a country may be involved.

The automatic execution of the method is controlled by software installed on the mobile device 22. This preferably involves an app, as it is known, on a smartphone. Elements of the software are, in particular, steps for connecting to the first station 20, scanning and detecting further networks, retrieving vehicle data via the first station 20, storing and keeping the vehicle data available, storing and keeping available access data for networks, connecting to the second station 23 after detecting same, transmitting the vehicle data from the mobile device 22 to the second station 23 and/or to a previously stored address of a web server 25, connecting to the first station 20 after the connection to the second station 23 is terminated.

While the above description constitutes the preferred embodiments of the present invention, it will be appreciated that the invention is susceptible to modification, variation and change without departing from the proper scope and fair meaning of the accompanying claims.

What is claimed is:

1. A system for transferring data from a wireless network of a vehicle (19), the system comprising:

a first station (20) for covering a first wireless network (21) secured by encryption, and a mobile device (22) for connecting to the first wireless network (21) and to a second wireless network (24), wherein the first station (20) is disposed in the vehicle (19), wherein access data for connecting to the first and second wireless networks (21, 24) are available in the mobile device (22), and wherein in the vehicle (19) data are available, which are transmitted from the first station (20) to the mobile device (22), and from there to the second station (23);

wherein the mobile device (22) is configured to detect the second station (23) having the second wireless network (24), and only after detecting the second station (23) to cause the data to be transmitted from the vehicle (19) via the first station (20) to the mobile device (22), and from there to the second station (23).

2. The system as claimed in claim 1, wherein the mobile device (22) has a connection to the first wireless network (21), wherein the mobile device (22) is configured to disconnect the connection to the first wireless network (21) after detecting the second wireless network (24) of the second station (23) and before connecting to the second wireless network (24) of the second station (23), and wherein the mobile device (22) is configured to restore the connection to the first station after transmitting the data to the second station (23).

3. The system as claimed in claim 1, wherein the mobile device (22) is configured to transmit the data via the second station (23) to a computer connected to the second wireless network (24).

4. The system as claimed in claim 1, wherein the first wireless network (21) of the first station (20) is a Wireless Local Area Network (WLAN).

5. The system as claimed in claim 1, wherein the second wireless network (24) of the second station (23) is a Wireless Local Area Network (WLAN).

6. The system as claimed in claim 1, wherein the mobile device (22) is Wireless-Local-Area-Network-enabled (WLAN-enabled).

7. The system as claimed in claim 6, wherein the mobile device (22) is a mobile phone comprising a WLAN module.

8. The system as claimed in claim 1, wherein the mobile device (22) is a smartphone having an app for controlling the system or individual steps within the system.

9. The system as claimed in claim 1, wherein the vehicle (19) is a trailer vehicle comprising an electronic braking system.

10. The system as claimed in claim 1, wherein the first station (20) is a Wireless-Local-Area-Network module (WLAN module), which is connected to an electronic system or an electronic control module of the vehicle (19).

* * * * *